(12) United States Patent
Beebe et al.

(10) Patent No.: US 10,862,303 B2
(45) Date of Patent: Dec. 8, 2020

(54) SYSTEMS AND METHODS FOR SHUNT POWER FACTOR CORRECTION

(71) Applicant: Jabil Inc., St. Petersburg, FL (US)

(72) Inventors: Ronald Beebe, St. Petersburg, FL (US); Christopher Compton, St. Petersburg, FL (US); David Eckerson, St. Petersburg, FL (US); Yizhe Liu, St. Petersburg, FL (US); Salman Talebi-Rafsanjan, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 0 days.

(21) Appl. No.: 16/352,313

(22) Filed: Mar. 13, 2019

(65) Prior Publication Data

US 2019/0214819 A1 Jul. 11, 2019

Related U.S. Application Data

(63) Continuation of application No. 15/563,906, filed as application No. PCT/US2016/024974 on Mar. 30, 2016, now abandoned.

(60) Provisional application No. 62/047,443, filed on Sep. 8, 2015, provisional application No. 62/140,725, filed on Mar. 31, 2015.

(51) Int. Cl.
| | |
|---|---|
| *H02J 3/12* | (2006.01) |
| *H02J 3/18* | (2006.01) |
| *H02S 40/32* | (2014.01) |
| *H02S 50/00* | (2014.01) |
| *H02M 7/48* | (2007.01) |

(52) U.S. Cl.
CPC ......... *H02J 3/12* (2013.01); *H02J 3/18* (2013.01); *H02M 7/48* (2013.01); *H02S 40/32* (2014.12); *H02S 50/00* (2013.01)

(58) Field of Classification Search
CPC ..... H02M 7/48; H02J 3/12; H02J 3/18; H02S 40/32; H02S 50/00
See application file for complete search history.

(56) References Cited

U.S. PATENT DOCUMENTS

| | | | | |
|---|---|---|---|---|
| 8,954,203 B2* | 2/2015 | Arditi | ........................ | H02J 3/18 700/286 |
| 9,473,042 B1* | 10/2016 | Chu | ........................ | H02M 7/44 |
| 2010/0188869 A1* | 7/2010 | Fredette | ................... | H02M 1/10 363/15 |
| 2010/0208501 A1* | 8/2010 | Matan | ........................ | H02J 3/18 363/95 |
| 2013/0107598 A1* | 5/2013 | Rojas | ..................... | H02J 3/1814 363/131 |
| 2017/0047760 A1* | 2/2017 | Rippel | ................... | H02J 7/0068 |
| 2017/0256949 A1* | 9/2017 | Stanton | ...................... | H02J 7/34 |

* cited by examiner

*Primary Examiner* — Thienvu V Tran
*Assistant Examiner* — Bart Iliya
(74) *Attorney, Agent, or Firm* — Thomas J. McWilliams; Barnes & Thornburg LLP

(57) ABSTRACT

Systems and methods are disclosed that operate to correct the electrical characteristics of an electric distribution system based on analysis at a particular point in the system, for example, at a customer's meter. To do so, the subject characteristic may be measured at the meter. The subject characteristic may be provided to a power inverter controller, which responds by modifying the characteristic of the inverter output to achieve the desired measurement at the meter.

15 Claims, 7 Drawing Sheets

SYSTEMS AND METHODS FOR SHUNT POWER FACTOR CORRECTION

CROSS-REFERENCE TO RELATED APPLICATIONS

This application is a continuation application that claims the benefit of priority to U.S. application Ser. No. 15/563,906, entitled: SYSTEMS AND METHODS FOR SHUNT POWER FACTOR CORRECTION", filed on Oct. 2, 2017, which claims priority to International Application No. PCT/US2016/024974, entitled "SYSTEMS AND METHODS FOR SHUNT POWER FACTOR CORRECTION", filed Mar. 30, 2016, which claims priority to U.S. Provisional Application No. 62/140,725, entitled "SYSTEMS AND METHODS FOR SHUNT POWER FACTOR CORRECTION", filed on Mar. 31, 2015, which claims priority to U.S. Provisional Application No. 62/047,443, entitled "SYNCHRONOUS BUCK INVERTER," filed on Sep. 8, 2014, all of which are incorporated herein by reference as if set forth in their entireties.

FIELD OF THE DISCLOSURE

The present disclosure relates to power conversion, and more particularly to ensuring the connection of a load to an electric utility grid has an alternating current (AC) waveform at a desired (e.g., unity) power factor, regardless of the power factor of the load, and regardless of the power factor of the grid. The AC waveform may be generated by an inverter using power from a DC power source, such as photovoltaic (PV) cells.

BACKGROUND

Power inverters are devices that convert direct current (DC) to alternating current (AC). Power converters, on the other hand, convert AC to DC. The name inverter conveys the idea that the inverter can be thought of as a power converter run "backwards", thereby converting DC to AC. Inverters have many uses, including converting DC power from a battery or photovoltaic source into AC power to supply a load designed for AC. Inverters may also be used to supply AC power to an electric utility grid. A grid-tied inverter is a power inverter that converts DC to AC and synchronizes the AC with the frequency and phase of the utility line to which it is tied. Applications for such inverters include converting DC sources, such as solar panels or small wind turbines, into AC that is compatible with the grid. In particular, photovoltaic (PV) cells in arrays of solar panels generate electrical power by converting solar radiation into direct current electricity using semiconductors that exhibit the photovoltaic effect, and this DC may then be converted to AC that is to be synchronized with the AC of the tied-in power grid.

An inverter can be designed for the particular input voltage, output voltage and frequency, and overall power handling requirements for the environment in which it will be used. As mentioned above, commonly, an inverter installation converts to AC a DC power source capable of supplying enough power for the demands of a load or system being supplied. The inverter does not produce any power; rather, the power is always provided by the DC source. Furthermore, an inverter may be designed to produce different periodic AC waveforms, such as a square wave, modified sine wave, pulsed sine wave, or a pure sine wave, depending on the needs of the load and the situation.

It is known from Fourier analysis that any periodic waveform that can be produced may be constructed from (or deconstructed into) the sum of a series of sine waves. The sine wave with the lowest frequency, which is the same frequency as the original waveform, is called the fundamental component. The other sine waves in the series, called harmonics, have frequencies that are integral multiples of the fundamental frequency. In other words, the portion of a periodic waveform that differs from a pure sine wave of the same frequency is caused by the harmonics. If a pure sine wave is desired at the output of the inverter, the effect of any harmonics in the output is a distortion of the desired waveform. The total harmonic distortion (THD) is the square root of the sum of the squares of the harmonic voltages divided by the fundamental voltage.

Most utility power generators have a rotating circular element (rotor) that spins inside of an armature. The circular motion of the rotor windings causes pure sine wave current and voltage to be generated in the armature, which is coupled through transformers to the utility grid. Accordingly, many loads that are powered by the utility grid are designed to operate best if their respective input is a pure sine wave at the standard voltage and frequency provided by the grid. As such, if such loads obtain their power through an inverter from a DC generator, they will operate best if the inverter output waveform is a pure sine wave and does not include significant harmonic distortion.

An inverter may comprise only solid state or discrete electronic components, or it may contain a combination of electronic and mechanical elements, such as some sort of rotary apparatus. The design of an inverter for a particular application depends on the characteristics of the DC input it will receive, the characteristics of the AC output required by the load or system it will supply, and any other purpose the inverter is expected to satisfy. Prior art inverters are disclosed, for example, in Salmi, et al., "Transformerless Microinverter for Photovoltaic Systems", pp. 639-650, vol. 3, issue 4, Int'l Journal of Energy and Environment (2012); Reddy et al., "Analysis and Modeling of Transformerless Photovoltaic Inverter Systems", pp. 2932-2938, vol. 3, issue 5, Int'l Journal of Modern Engineering Research (2013); and Dreher et al., "Comparison of H-Bridge Single-Phase Transformerless PV String Inverters", 10th IEEE/IAS Int'l Conference on Industry Applications, pp. 1-8 (November 2012).

PV arrays that supply power to a utility grid are increasing in popularity. Solid-state inverters have become an important technology for coupling such PV systems to the grid. Integration of PV power generation systems into the grid plays an increasingly important role in providing sustainable electric power. A commonly configured grid-connected PV system comprises an array of PV panels connected to an inverter that is in turn operatively coupled to the grid. The inverter may also be connected to loads, which may also be coupled to the grid and designed to operate using power from the grid.

Some more recent solar power installations may also be configured to aid in regulating the voltage of the grid, and may also perform other grid support tasks. In addition to converting DC to AC synchronized to the grid, inverters in such installations can be configured and arranged to synthesize reactive power similar to that produced by coupling capacitive or inductive loads to the grid. Reactive power arises when the AC current wave leads or lags the voltage wave. Providing reactive power with leading current (e.g., by coupling a load containing capacitors to the grid) boosts AC line voltage, and is said to add reactive power to the grid. Providing reactive power with lagging current (e.g., by coupling motors containing wire windings to the grid) pulls AC voltage down, and is said to consume or subtract reactive power from the grid. A PV array coupled to the grid through an inverter that isn't designed to synthesize reactive power will typically add reactive power to the grid. If the reactive power is not regulated, the grid voltage on the feeder may exceed its permitted level, with possible adverse consequences to loads coupled to the feeder. This can be particularly problematic when power demand is low and solar power generation is high, such as on sunny weekends in the spring or early summer.

A utility might prevent such an outcome, for example, by upgrading the feeder with thicker cables, or by limiting how much solar power it will allow to be coupled to its distribution feeders. It might also require PV operators to subtract reactive power when the output from their PV arrays is high, for example, when the output exceeds 50 percent of capacity. The California public utility commission (CPUC) has gone even further, and recently approved a state-specific standard for so-called smart inverters that can dynamically regulate output voltage and reactive power. This standard calls for a smart inverter that detects output voltage exceeding 1 percent of the top of the legally permitted grid voltage range, and then operates to trim the reactive power it generates. Conversely, if line voltage drops to 1 percent below the bottom of the permitted grid voltage range, which can happen as passing clouds suddenly block out the sun for example, the standard's smart inverter will operate to increase the reactive power it generates. It is noted that European nations, most particularly Germany, have been encouraging the use of active inverters for many years. In general, these approaches to active inverters coupled to the utility electricity distribution grid are based on measurements of the grid voltage.

The power factor of an AC electrical power system is defined as the ratio of the real power flowing to the load to the apparent power in the circuit. As such, it is a dimensionless number in the range of −1 to 1. Real power is the delivered power that can perform work. In contrast, apparent power is the product of the current and voltage of the circuit. Due to energy stored in a load and returned to the source, or due to a non-linear load that distorts the wave shape of the current drawn from the source, the apparent power may be far greater than the real power. In an electric power system, a load with a low power factor absolute value draws more current than a load with a higher power factor for the same amount of useful power transferred. The higher currents increase the energy lost in the distribution system, and may require larger, more expensive conductors and possibly other equipment as well, such as pole-top capacitor banks. Because of the increased equipment costs and wasted energy of systems using such additional equipment, electrical utilities will usually charge industrial and commercial customers a penalty where the customer's load results in a low power factor at the respective meter.

As referenced, linear loads with low power factor (such as induction motors) can be corrected with a passive network of capacitors or inductors. Non-linear loads, such as rectifiers, distort the current drawn from the system, resulting in increasing harmonics in the system. Active or passive power factor correction devices and other power conditioners may be used to counteract the distortion and raise the power factor. Such devices may be placed at a central substation, spread out over a distribution system, or built into power-consuming equipment.

Although much of the foregoing and the following disclosure focus on PV systems, those skilled in the art will appreciate that similar issues arise in other types of DC generation such as wind farms, and in other contexts that require converting DC to AC.

SUMMARY OF THE DISCLOSURE

Systems and methods are disclosed that operate to correct the power factor, that is, to drive the power factor of an electric distribution system to a desired value (e.g.,unity) at a particular point in the system, for example, at a customer's meter. To do so, the power factor is measured at the meter. The power factor is provided to a power inverter controller, which responds by modifying the power factor of the inverter output to achieve unity at the meter.

A power inverter system and method are disclosed. An exemplary system and method may include a controller capable of generating signals based on an analysis of current measured electrically proximate a meter operatively coupled via a grid power line to an electric distribution grid and via a load power line to a load; a power inverter including a power input for receiving DC power, a signal input for receiving signals from the controller, a power output for providing AC power to at least one of the load and the electric distribution grid, a voltage converter for converting a voltage level of the DC power to an effective voltage level of the AC power, a current converter for converting a current of the DC power to an effective current of the AC power, and a plurality of components electrically responsive to the signals received from the controller.

Thus, the disclosure provides a DC to AC power inversion system suitable to correct power factor and to negate distortion, using a controller proximate to a power consumption meter.

BRIEF DESCRIPTION OF THE FIGURES

The present disclosure will become more fully understood from the detailed description given herein below and the accompanying drawings which are given by way of illustration only, and which thus do not limit the present disclosure, and wherein.

DETAILED DESCRIPTION

Figure 1:
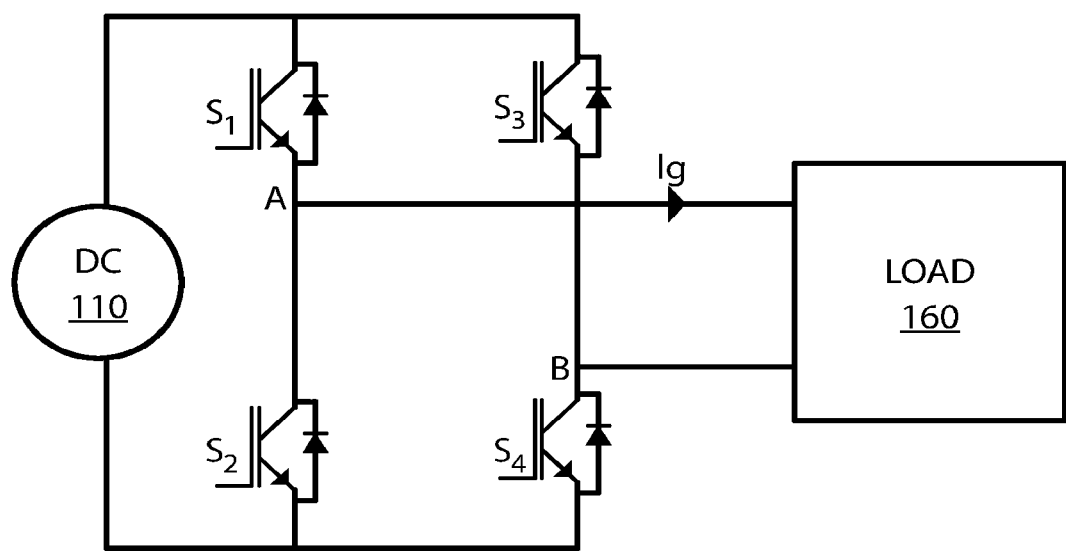
FIG. 1 is an illustration of a known inverter arrangement.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough to fully convey the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Figure 2:
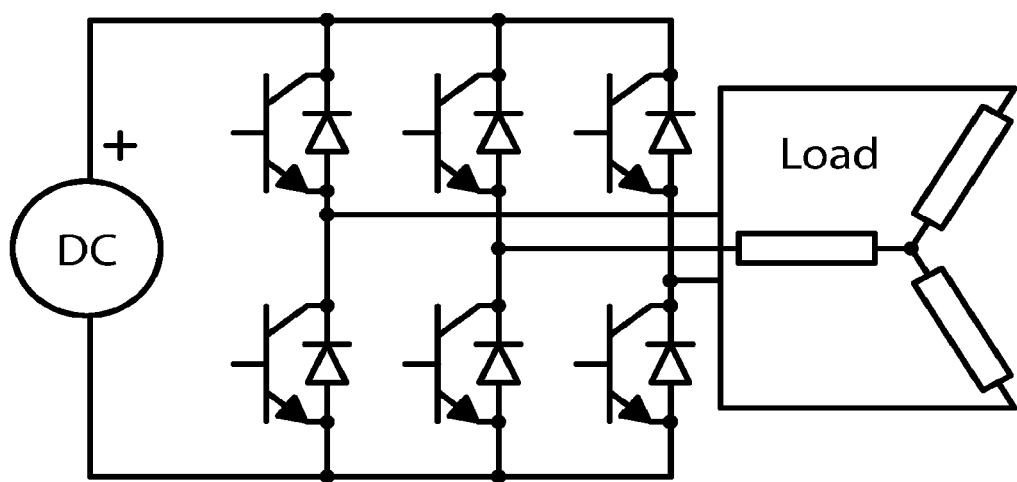
FIG. 2 is a three-phase analog of the inverter of FIG. 1.
Figure 3A:
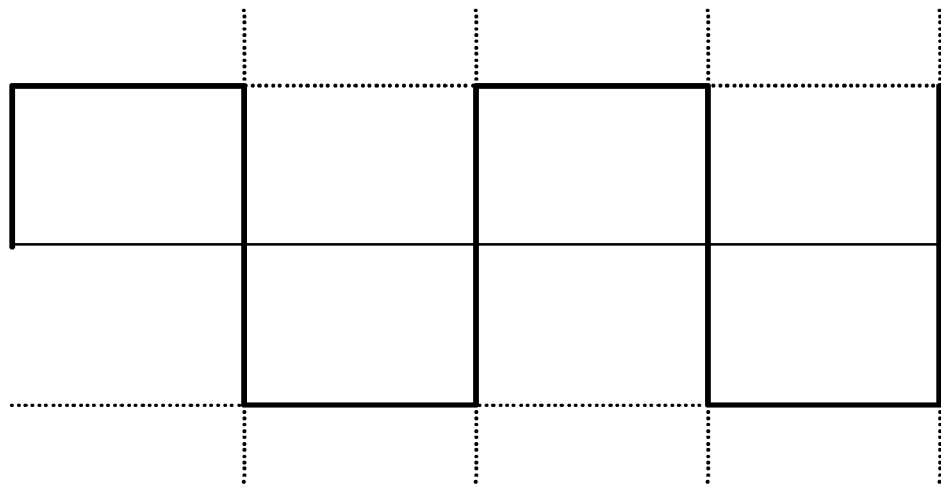
FIG. 3A illustrates two cycles of an inerter-resultant output AC waveform.

One illustrative prior art inverter arrangement is shown in FIG. 1. The inverter of FIG. 1 is configured in a full-bridge topology comprising four switches with antiparallel diodes. Each pair of diagonal switches ($S_1$-$S_4$, $S_2$-$S_3$) operates complementary to the other group of switches. As a result, the inverter output voltage has two levels. Illustratively, switches $S_1$ and $S_4$ are closed while switches $S_2$ and $S_3$ are opened, forming the positive half wave of the output. Then, switches $S_1$ and $S_4$ are opened and switches $S_2$ and $S_3$ are closed, forming the negative half wave of the output. Then, the cycle is repeated. Two cycles of the resultant output AC waveform, called a square wave, are shown in FIG. 3A. FIG. 2 shows a three phase analog of the inverter of FIG. 1, and operates similarly to provide three phase power to a three phase load. It will be apparent to those of skill in the art that most, if not all, of the following disclosure can be similarly extended to analogous three phase systems. Likewise, in embodiments, a synchronous buck inverter, such as described in co-owned U.S. patent application Ser. No. 62/047,443 (hereby incorporated herein in its entirety) may be used in accordance with this disclosure.

Figure 3B:
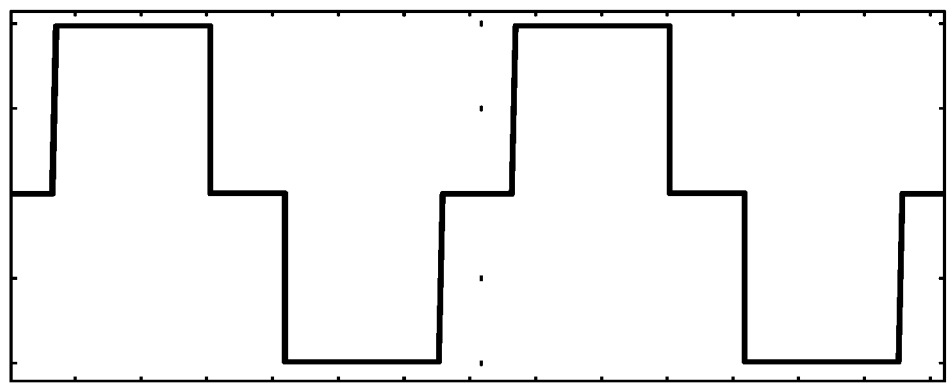
FIG. 3B illustrates the resultant waveform of an insertion of a zero-voltage step between the positive and negative sections of a square-wave.
Figure 3C:
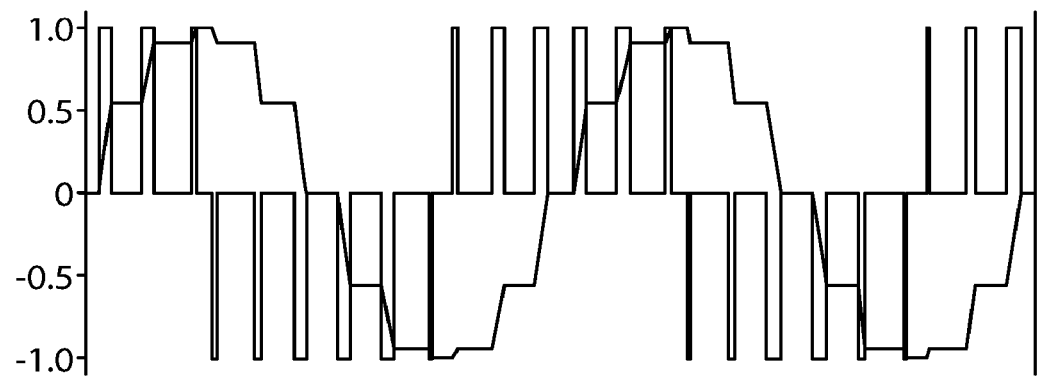
FIG. 3C illustrates an example of MPWM switching control overlaid with a sinusoidal waveform.
Figure 3D:
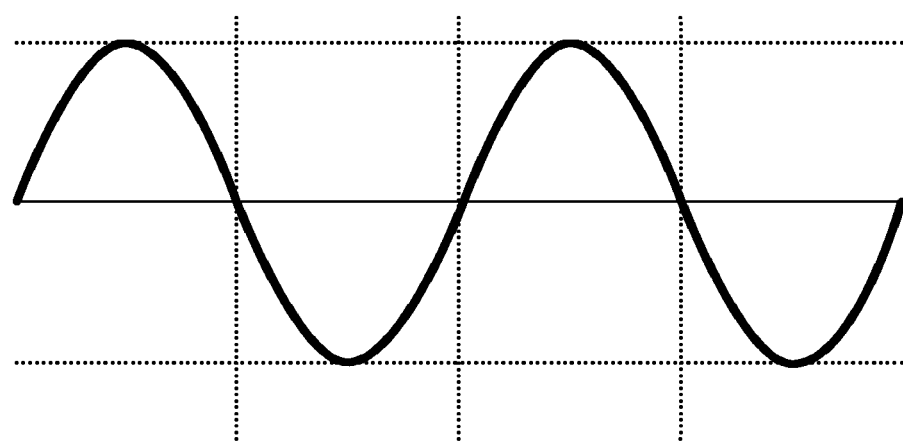
FIG. 3D illustrates an exemplary pure sine wave inverter output.

Although the square wave inverter output shown in FIG. 3A is one of the simplest output waveforms, the total harmonic distortion (THD) it entails is very large, at about 45% THD. This THD can be cut very nearly in half by inserting a zero-voltage step between the positive and negative sections of the square-wave, as shown in FIG. 3B. This is a simple example of a wave forming technique called pulse-width modulation (PWM). PWM can also be used to regulate or adjust an inverter's output voltage. Another type of PWM, called multiple pulse-width, or carrier-based, PWM (MPWM) control schemes involve using waveforms that are composed of many narrow pulses. The frequency represented by the number of narrow pulses per second is called the switching frequency or carrier frequency. MPWM control schemes allow a much wider range of output voltage and frequency adjustments to be made, while also reducing the THD of the waveform. An example of MPWM switching control overlaid with the resulting improved sinusoidal waveform is shown in FIG. 3C. Using these and many other techniques, an inverter can be designed that can produce an AC waveform having a wide range of characteristics, including the pure sine wave shown in FIG. 3D, for use in particular circumstances and applications. In addition, inverters can be designed to provide adjustable control over many of those output characteristics, including the output voltage, current, power factor, frequency, harmonic spectrum, and the like.

Figure 4:
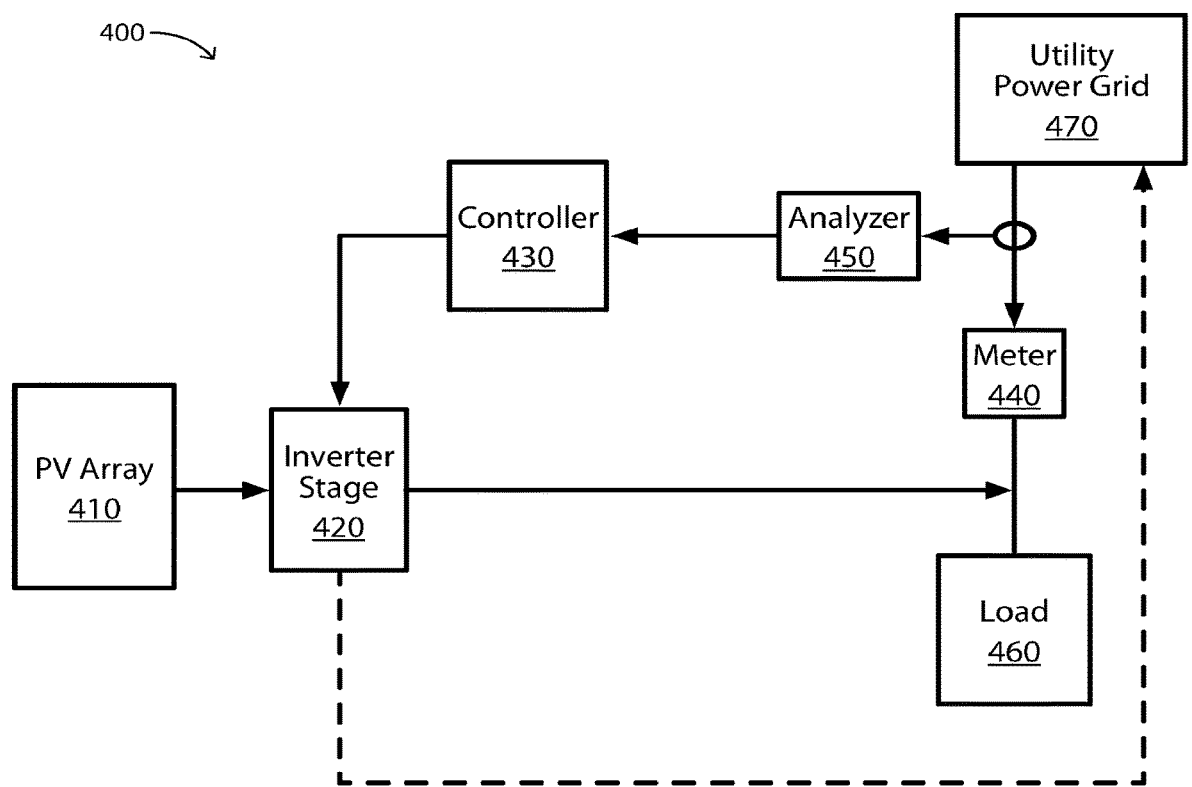
FIG. 4 illustrates an exemplary embodiment of a power system.

Turning now to FIG. 4, an exemplary embodiment of power system 400 is shown, comprising PV array 410 that may include a plurality of PV panels, each of which may comprise a plurality of photovoltaic cells connected in series, and a plurality of such series may further be connected in parallel to form a source of DC power. That is, PV array 410 converts solar energy incident on the PV panels into direct current (DC) electricity, thereby generating power at a voltage and current determined by the electricity produced by each cell and the configuration used to connect them together.

As shown, the DC is converted to AC via an inverter stage 420. There are two basic functions required of the inverter stage 420 to convert DC input at certain voltage, to AC output at an effective voltage (called the root mean square (RMS) voltage because of the way it's calculated) that may have a different value than the input DC. These two functions are to convert the DC to AC, and adjust the voltage level; and either function may be performed first. That is, in one arrangement a switching buck or boost converter may be used to convert the DC generated by the PV array to a respectively lower or raise DC voltage produced by the array, and then convert this to AC using the inverter. The other arrangement uses the inverter first to convert the DC to AC at the grid frequency (60 hertz in most of the western hemisphere, 50 hertz in most of the eastern hemisphere), and then a transformer to convert the inverter output AC voltage to the grid voltage.

Most residential and commercial electrical equipment, such as load 460, is designed to accept AC electricity provided by a utility, within standard voltage and frequency ranges set by a regulatory agency. Accordingly, the afore-discussed inverter stage 420 may be advantageously arranged to produce AC of the same voltage and frequency as the utility.

The utility grid 470 typically further provides electricity that has a sine waveform, at or near a unity power factor. As such, the electrical load 460 may also have been designed to operate best using electricity that has a sine waveform and unity power factor. Thus, it may be desirable to configure the inverter 420 to produce electricity that mimics the waveform and power factor provided by the grid. The AC output from the inverter stage 420 may then be coupled to provide power to the load 460, and may additionally or alternatively be coupled to the utility grid 470 to provide power to the grid, as shown in the figure. In addition, it may also be possible to couple DC from the PV array 410 to provide power, directly or through one or more buck/boost converters, to DC loads such as lights, battery chargers, DC motors and the like (not shown).

As noted previously, real power is power delivered to a load that can perform work, whereas apparent power is the product of the current and voltage of the circuit. Some types of loads may store energy, for example in an electric or magnetic field, and return the stored energy to the source. Some types of loads may be non-linear and distort the wave shape of the current drawn from the source. Due to the nature of such loads, the apparent power provided by a utility to a load may be far greater than the real power actually used by the load. In an electric power system, a load with a low power factor draws more current than a load with a higher power factor, for the same amount of useful power supplied. The higher current increases the energy lost in the distribution grid, and may require capital expenditures simply to compensate for the effect of the low power factor load on the grid. Because of the costs and wasted energy, utilities may penalize customers whose load results in a low power factor at their meter. Furthermore, if the power factor at the meter is low, the power factor of the grid proximate the meter will also be dragged down, and may adversely affect the power quality delivered to the customers by that part of the grid.

Figure 5:
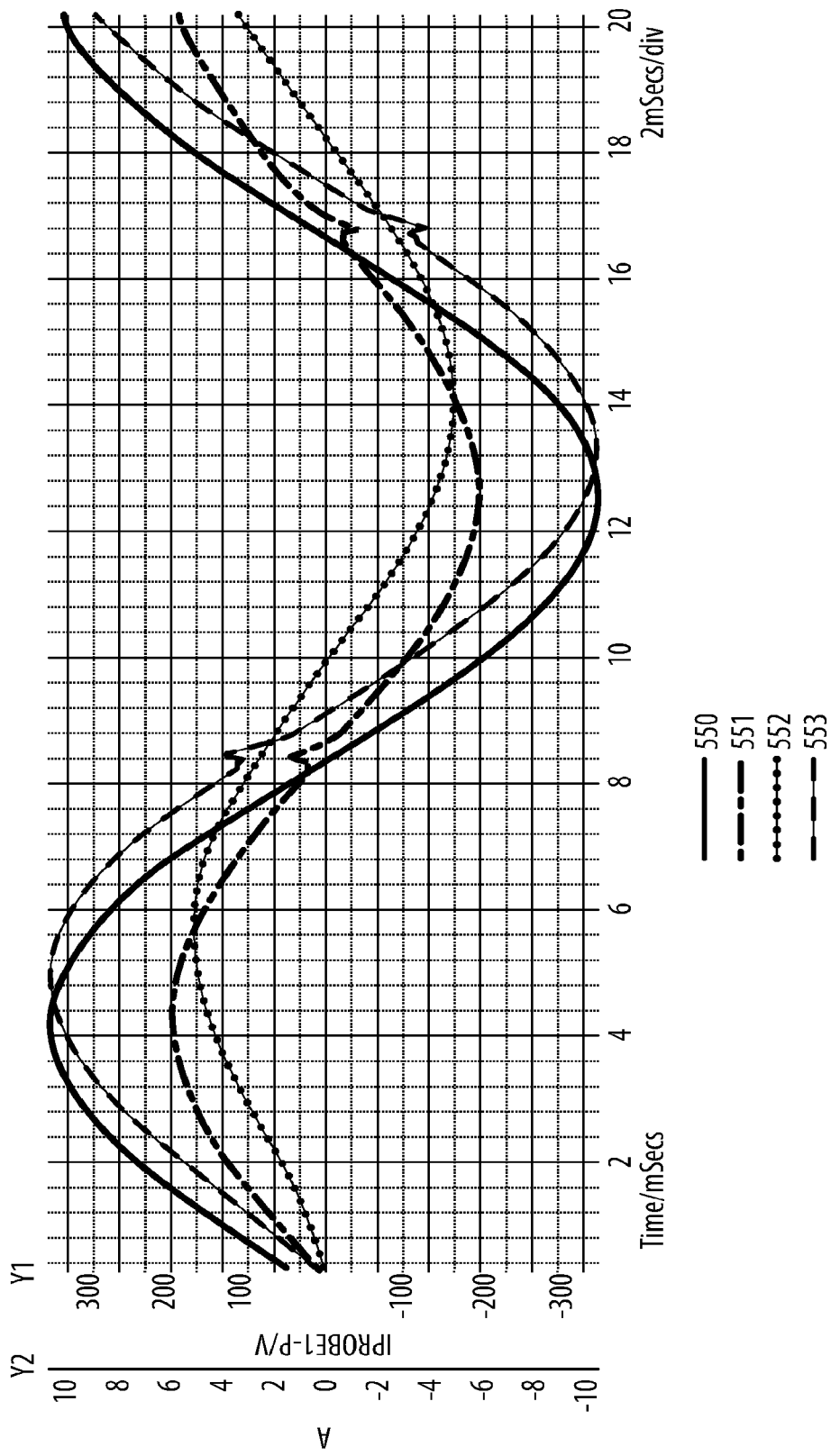
FIG. 5, shows illustrative simulated waveforms with a grid voltage waveform, the grid current, the load current, and the inverter output current, in an embodiment.

The adverse effect on the grid of linear loads with low absolute power factor, such as induction motors, or the PV array itself, can be corrected by adding reactive power to the system. The adverse effect on the grid of non-linear loads, such as rectifiers, that cause harmonic distortion in the grid current, can be corrected by adding current to the system adapted to counter the harmonic distortion, by modifying the waveform of the current. An inverter stage 420 electrically coupled to the grid, and that receives power from a DC source, can be controlled to condition its output to provide these corrections. To do so, a controller 430 can cause the inverter stage 420 to output a waveform specifically adapted to counteract the distortion, at a power factor specifically adapted to counteract the low power factor. Referring briefly to FIG. 5, an illustrative simulated waveform is shown with grid voltage waveform 550, the grid current 551, the load current 552, and the inverter output current 553. As can be seen in the figure, the inverter stage 420 is not trying to output a waveform specifically adapted to counteract the distortion, but is compensating the phase shift caused by the load current to result in a desired power factor at the meter. The output current of the inverter may be the sum of the grid current and the load current. Since in the current control loop the current sensors on the grid side detect the grid current, and compare to the sinusoidal reference signals, which is in phase with the grid voltage. Referring back to FIG. 4, the inverter stage 420 may be coupled to the grid at or near the electric meter 440, where the power being delivered to or from the grid, and its power factor, is measured by the utility. Most advantageously, an inverter that receives DC from a generator such as a PV array may be controlled to produce an AC output that results in a unity power factor at the meter by synthesizing reactive power similar to that produced by coupling a capacitive or inductive load, as needed, to the grid sufficient to result in a power factor of unity at the meter. For example, 10 CAP Cell Blocks may be used in parallel connection between Line and Neutral (Each can provide 1KVAR) as a "shunt solution" to provide 0-10 KVAR reactive power by hard switching in and out those CAP Cell Blocks with relays. Compared to CAP Cell Block solutions, an inverter may be more dynamic and have a better reactive power injection capability.

To correct the power factor, analyzer 450 may be placed at or near the meter 440 to determine the value of the power flowing through the meter 440 and the power factor of the system at that point. This information is conveyed to controller 430, which uses the information to calculate how much lead or lag must be produced in the inverter stage output to correct the power factor at the meter to unity. From that, the controller determines how the configuration of the inverter stage 420 should be modified to produce the needed lead or lag, and communicates with the inverter stage 420 to effect the determined configuration. Power output from the inverter stage 420 can be coupled between the meter and the load (shown as a solid arrow), in which case the power generated by the PV array 410 can supplement power from the utility grid 470 if it is not sufficient to power the load 460, and can provide to the grid any excess power if it is. In this arrangement, the meter will measure the energy flowing from or to the grid. Alternatively, the power generated by the PV array 410 can be coupled directly to the grid 470 (shown as a dashed arrow), and be tracked separately from the meter 440 between the grid 470 and the load 460. Either way, the power factor of the meter 440 may be corrected to unity by the action of the analyzer 450, the controller 430, and the inverter stage 420.

In exemplary embodiments, analyzer 450 and/or controller 430 may be wirelessly equipped, and may act regionally to correct, for example, power factors over a number of residences. For example, in embodiments wherein a first residence is providing excess power, this power may allow for power factor correction of a second residence, wherein either the analyzers 450 or controllers 430 of the first and second residences are in communication.

In an embodiment, the inverter stage 420 can be constructed and configured to be bi-directional. If so, the inverter stage 420 can convert generated DC power to AC to power the load 460, or to supply AC power to the grid 470, or both, during daylight hours when the PV array 410 is generating. When the sun goes down, the inverter stage 420 can convert AC from the grid 470 into DC, for example, to charge a bank of batteries (not shown). This may be advantageous, for example, where batteries are provided to supplement power available during periods of peak demand, or to provide backup power if other power sources 410, 470 are compromised.

In an embodiment, to correct for harmonic distortion, analyzer 450 determines the waveform of the current flowing through the meter 440. This information is conveyed to controller 430, which uses it to now to calculate how much harmonic distortion must be produced in the inverter stage output to counteract the distortion in the waveform at the meter and restore it to a pure sine wave. From that, the controller determines how the configuration of the inverter stage 420 should be modified to produce the waveform needed to counteract the distortion at the meter, and communicates with the inverter stage 420 to effect the determined configuration. The power output from the inverter stage 420 will then have a waveform with distortion complimentary to the distortion at the meter and, when combined at the meter, will result in the desired pure sine wave.

In embodiments, analyzer 450 includes a spectrum analyzer that measures the current wave at the meter 440, and analyzes it to determine the magnitude of its spectrum, at the fundamental line frequency and as many harmonic components as fall within the full frequency range of the analyzer. For example, the current waveform may be determined using a current probe or clamp placed around the conductor supplying the meter 440, and subjected to a fast Fourier transform (FFT) analysis to resolve it into its frequency components. By analyzing the frequency spectrum of the current waveform at the meter, the dominant frequency, power, distortion, harmonics, bandwidth, and other spectral components of the current can be obtained that are not easily detectable in time domain waveforms. In some illustrative embodiments, FFT is not needed for power factor control, particularly in instances where placing a spectrum analyzer in a control loop is impractical. In such instances, performing FFT analysis may require large amounts of processing power, which in turn may put a large burden on the DSP CPU and causes a long delay in the control loop which may contribute to instability. In cases, where FFT is required, it may be conducted in an off line manner not in a real time loop in some illustrative embodiments. In order to extract harmonics level, several cycles at 60 Hz may be used while the controller is running at switching frequency speed. Accordingly, analyzer block (450) may be configured as an independent and parallel configuration such that independently runs and occasionally provides the controller with updated information. In such a configuration, the current analyzer may be replaced by feedback and conditioning circuitry.

For example if unity power factor is needed, the system doesn't need to do any FFT, the feedback system can monitor the grid voltage and source the controller with a scaled signal in phase with the grid voltage to achieve unity power factor. If a non-unity power factor is required then grid voltage feedback plus the demanded power factor plus the MPPT information or load demands can be enough for the controller. The controller system compares the reference and the distroted output and compensate for the harmonics by its nature.

Figure 6:
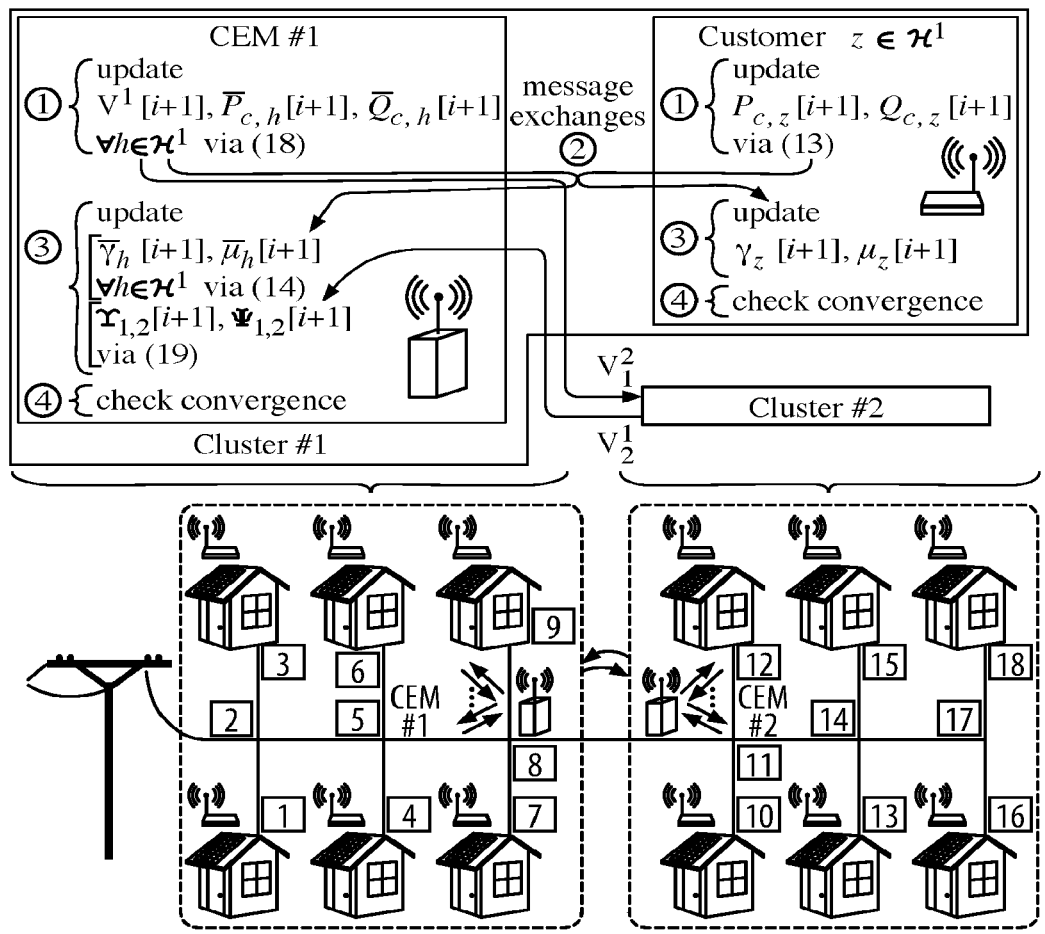
FIG. 6 shows a wireless/PLC-based communication system for smart grids in an illustrative distributed power system.

It should be understood by those skilled in the art that the present disclosure is applicable to other communication and power systems. For example, FIG. 6 shows a wireless/PLC-based communication system for smart grids in an illustrative distributed power system. Smart grid may be considered a modernized electrical grid that uses analog or digital information and communications technology to gather and act on information—such as information about the behaviors of suppliers and consumers—in an automated fashion to improve the efficiency, reliability, economics, and sustainability of the production and distribution of electricity. Electronic power conditioning and control of the production and distribution of electricity are aspects of the smart grid.

The disclosed embodiments and descriptions are provided to enable any person skilled in the art to make or use the invention, the scope of which is defined by the claims. Various modifications to the described subject matter will be readily apparent to those skilled in the art, and the generic principles defined herein may be applied to such variations without departing from the spirit or scope of the invention. Thus, the invention is not intended to be limited to the specific embodiments described herein, but rather is deemed to be accorded the widest scope consistent with the principles and novel features disclosed herein.

What is claimed is:

1. A power inverter system, comprising:
a plurality of controllers, each capable of generating signals based on an analysis of current measured electrically proximate to and on an electrical distribution grid side of each of a respectively uniquely corresponded one of a plurality of meters, each of the controllers being operatively coupled via a grid power line to the electric distribution grid and uniquely via a load power line to a load represented by the corresponded one of the plurality of meters;
a power inverter corresponded uniquely to each of the plurality of controllers, comprising:
a power input for receiving DC power;
a signal input for receiving signals from the controller;
a power output for providing AC power to at least one of the load and the electric distribution grid;
a voltage converter for converting a voltage level of the DC power to an effective voltage level of the AC power;
a current converter for converting a current of the DC power to an effective current of the AC power; and
a plurality of components electrically responsive to the signals received from the controller,
wherein the power inverter corresponded to each of the plurality of controllers is controlled by a wirelessly-communicative combination of that one and other regional ones of the plurality of controllers to regionally balance at least a power factor across the plurality of meters by regionally balancing individual ones of the power inverters.

2. The power inverter system of claim 1, further comprising a photovoltaic array capable of providing the DC power to the power input.

3. The power inverter system of claim 1, wherein the voltage converter comprises one of a buck and a boost inverter.

4. The power inverter system of claim 1, wherein the power inverter further comprises a grid frequency transform.

5. The power inverter system of claim 1, wherein the load further comprises a DC load, and wherein the DC voltage received at the power input is at least partially provided unconverted to the DC load.

6. The power inverter system of claim 5, wherein the DC load comprises at least one battery.

7. The power inverter system of claim 1, wherein the signals generated comprise a modification to a power factor for execution by the plurality of components.

8. The power inverter system of claim 7, wherein the modification comprises an injection of reactive power.

9. The power inverter system of claim 7, wherein the modification comprises a harmonic distortion counteraction.

10. The power inverter system of claim 1, further comprising an analyzer capable of executing the analysis.

11. The power inverter system of claim 10, wherein at least one of the analyzer and the controller comprises a wireless communicator.

12. The power inverter system of claim 10, wherein the analyzer comprises a spectrum analyzer.

13. The power inverter system of claim 1, wherein the power inverter is bi-directional.

14. The power inverter system of claim 1, wherein the electrical measure proximate the meter comprises a clamp probe placed about a conductor supplying the meter.

15. The power inverter system of claim 1, further comprising:
- a direct current (DC) power source coupled to the power inverter;
- a spectrum analyzer coupled to the controller;
- a current clamp coupled to measure the current of the grid power line proximate the meter.

* * * * *